(12) United States Patent
Kern et al.

(10) Patent No.: US 8,054,033 B2
(45) Date of Patent: Nov. 8, 2011

(54) BRUSHLESS, THREE PHASE MOTOR DRIVE

(75) Inventors: Lynn R. Kern, Tucson, AZ (US); James P. McFarland, Tucson, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 457 days.

(21) Appl. No.: 12/393,996

(22) Filed: Feb. 26, 2009

(65) Prior Publication Data
US 2010/0102766 A1   Apr. 29, 2010

Related U.S. Application Data

(60) Provisional application No. 61/108,320, filed on Oct. 24, 2008.

(51) Int. Cl.
*H02P 23/00* (2006.01)
(52) U.S. Cl. ............... 318/811; 318/400.35; 318/400.05
(58) Field of Classification Search .................. 318/811, 318/701, 400.05, 400.35, 400.01, 400.04, 318/700
See application file for complete search history.

(56) References Cited

U.S. PATENT DOCUMENTS

| | | | |
|---|---|---|---|
| 5,614,797 A | 3/1997 | Carobolante | |
| 5,731,670 A | 3/1998 | Galbiati et al. | |
| 5,929,577 A | 7/1999 | Neidorff et al. | |
| 6,473,562 B1 | 10/2002 | Stephan | |
| 6,512,342 B2 | 1/2003 | Kawagoshi | |
| 6,642,681 B2 | 11/2003 | Kawabata et al. | |
| 6,826,499 B2 | 11/2004 | Colosky et al. | |
| 7,054,980 B2 | 5/2006 | Wurzburg | |
| 7,096,134 B2 | 8/2006 | Miller, Jr. | |
| 7,183,734 B2 | 2/2007 | Lassen | |
| 7,432,677 B2 | 10/2008 | Heydt et al. | |
| 2008/0238349 A1* | 10/2008 | Cheng | 318/400.05 |
| 2008/0297081 A1 | 12/2008 | Morita et al. | |
| 2009/0049463 A1 | 2/2009 | Ueda | |
| 2009/0049464 A1 | 2/2009 | Kang | |
| 2009/0096397 A1 | 4/2009 | Paintz et al. | |

OTHER PUBLICATIONS

"8904. 3-Phase Brushless DC Motor Controller/Driver With Back-EMF Sensing"; Allegro Microsystems, Inc.; Oct. 31, 2006; 18 pages.

(Continued)

*Primary Examiner* — Karen Masih
(74) *Attorney, Agent, or Firm* — Meyertons Hood Kivlin Kowert & Goetzel, P.C.; Jeffrey C. Hood

(57) ABSTRACT

A control method for a sensor-less, brushless, three-phase DC motor. A pulse-width modulation (PWM) duty cycle may be calculated. A voltage induced by rotation of a rotor may be sampled at a first expected zero crossing value to produce a first sampled voltage value. An average of a plurality of sampled voltage values, including voltage values sampled at a plurality of prior expected zero crossing values and the first sampled voltage value, may be calculated. The first sampled voltage value may be subtracted from the calculated average to produce a delta zero crossing error. The delta zero crossing error may be multiplied by a first constant representing electromechanical properties of the motor to produce a representation of an angular velocity. One or more time values may be generated based on the representation of the angular velocity. Operation of the motor may be controlled based on the one or more time values and the PWM duty cycle.

20 Claims, 8 Drawing Sheets

OTHER PUBLICATIONS

Ken Berringer, Bill Lucas, Leos Chalupa, and Libor Prokop; "Sensorless Brushless dc Motor Using the MC68HC908MR32 Embedded Motion Control Development System—AN 1858"; Freescale Semiconductor; 2004; 36 pages.

"XC164CM—Driving of a Brushless DC Motor without Sensors—AP 16090"; Infineon Technologies; 2006; 75 pages.

"IRMCF371—Sensorless Motor Control IC for Appliances"; International Rectifier; Dec. 5, 2006. 30 pages.

Jorge Zambada; "AN1078—Sensorless Field Oriented Control of PMSM Motors"; Microchip Technology Inc.; 2007; 30 pages.

"Sensorless Spindle Motor Controller—ML4411/ML4411A"; Micro Linear; May 1997; 15 pages.

"TDA5140A—Brushless DC Motor Drive Circuit"; Philips Semiconductors; Apr. 1994; 24 pages.

"Brushless Motor Driver with Speed Control for Portable Cassette Recorders—LB1877V"; Sanyo Electric Co., Ltd.; Aug. 1999; 7 pages.

"Fan Motor Driver—LV8800V"; Sanyo Semiconductor Co., Ltd; Aug. 2007; 8 pages.

"Sensorless Brushless DC Motor Reference Design—AN208"; Silicon Laboratories; 2006; 40 pages.

"Autonomous Three Phase Fan Controller—EMC3000"; Standard Microsystems Corporation; 2006; 8 pages.

"An Introduction to Sensorless Brushless DC Motor Drive Applications with the ST72141—AN1130"; ST Microelectronics; 2000; 29 pages.

"3-Phase Full-Wave Sensorless Controller for Brushless DC Motors—TB6537P/PG, TB6537F/FG"; Toshiba; Aug. 4, 2003; 17 pages.

"Sensorless Brushless DC Motor Control with Z8 Encore! MC Microcontrollers—AN022601-0905"; ZiLOG; 2005; 64 pages.

* cited by examiner

BRUSHLESS, THREE PHASE MOTOR DRIVE

PRIORITY CLAIM

This application claims benefit of priority of U.S. Provisional Patent Application Ser. No. 61/108,320 titled "Sensorless, Brushless, Three Phase Motor Drive", filed on Oct. 24, 2008, whose inventor was Lynn R. Kern, and which is hereby incorporated by reference as though fully and completely set forth herein.

BACKGROUND OF THE INVENTION

1. Field of the Invention

The invention generally relates to DC (Direct Current) motors used in various applications, such as hard disk drive motors, cooling fans, drive motors for appliances, etc.

2. Description of the Related Art

An electric motor uses electrical energy to produce mechanical energy. Electric motors are used in a large number of applications, including a number of different household appliances, pumps, cooling fans, etc. Motors can generally be classified as either alternating current (AC) motors or direct current (DC) motors.

Motors generally include a rotor, which is the non-stationary (moving) part of the motor, and a stator, which is the stationary part of the motor. The stator generally operates as a field magnet (e.g., electromagnet), interacting with an armature to induce motion in the rotor. The wires and magnetic field of the motor (typically in the stator) are arranged so that a torque is developed about the rotor's axis, causing rotation of the rotor. A motor typically also includes a commutator, which is an electrical switch that periodically reverses the current direction in the electric motor, helping to induce motion in the rotor. The armature carries current in the motor and is generally oriented normal to the magnetic field and the torque being generated. The purpose of the armature is to carry current crossing the magnetic field, thus creating shaft torque in the motor and to generate an electromotive force ("EMF").

In a typical brushed DC motor, the rotor comprises one or more coils of wire wound around a shaft. Brushes are used to make mechanical contact with a set of electrical contacts (called the commutator) on the rotor, forming an electrical circuit between the DC electrical source and the armature coil-windings. As the armature rotates on axis, the stationary brushes come into contact with different sections of the rotating commutator. The commutator and brush system form a set of electrical switches, each firing in sequence, such that electrical-power always flows through the armature coil closest to the stationary stator (permanent magnet). Thus an electrical power source is connected to the rotor coil, causing current to flow and producing electromagnetism. Brushes are used to press against the commutator on the rotor and provide current to the rotating shaft. The commutator causes the current in the coils to be switched as the rotor turns, keeping the magnetic poles of the rotor from ever fully aligning with the magnetic poles of the stator field, hence maintaining the rotation of the rotor. The use of brushes creates friction in the motor and leads to maintenance issues and reduced efficiency.

In a brushless DC motor design, the commutator/brushgear assembly (which is effectively a mechanical "rotating switch") is replaced by an external electronic switch synchronized to the rotor's position. Brushless DC motors thus have an electronically controlled commutation system, instead of a mechanical commutation system based on brushes. In a brushless DC motor, the electromagnets do not move, but rather the permanent magnets rotate and the armature remains static. This avoids the problem of having to transfer current to the moving armature. Brushless DC motors offer a number of advantages over brushed DC motors, including higher efficiency and reliability, reduced noise, longer lifetime (no brush erosion), elimination of ionizing sparks from the commutator, and overall reduction of electromagnetic interference (EMI).

One technique used to reduce power in some applications has been the introduction of Three Phase Brushless Motors. The typical configuration for these motors is shown in FIG. 1. The drive electronics for these motors typically rely on Hall elements (Hall effect sensors) to detect the absolute position of the rotor at all times, and switch drive transistors to maintain motor rotation. A Hall effect sensor is a transducer that varies its output voltage in response to changes in magnetic field. The motors are often electrically connected in a "Y" configuration, so named due to the resemblance to the letter "Y". The common point for the three coils is connected to the electrical source, and the drive electronics switch the drive transistors to maintain the rotating electro-magnetic field required to turn the motor.

A second method requires the use of six (6) drive transistors, as shown in FIG. 2. In this configuration, one high-and low-side pair are on at any point in time, completing the electrical circuit through two of the three legs of the motor. Using the un-energized coil as a magnetic sensor to determine the rotor position is known as Back Electro-Motive Force (BEMF) detection. The motivation for this technique is the elimination of the relatively expensive Hall elements and associated electronics. BEMF commutation techniques have successfully been applied to a wide-range of motors.

The prior art literature describes many different techniques for both basic commutation and enhanced techniques designed to improve the acoustic signature of the fan under operation. The architectures for these solutions fall into two basic categories, Mixed-Signal Micro-Controller Unit (MCU), or analog Application Specific Integrated Circuit (ASIC). The simplest of all these is the low-side commutation scheme.

There are a number of Analog ASIC solutions using differential commutation schemes currently available. The range of complexity in the algorithm varies, with attempts to "soften" the startup current through various techniques, until the BEMF signal can be detected. The Analog ASIC solutions tend to use external components to generate reference ramps and saw-tooth waveforms to be used as references against motor coil responses. While more compact, the analog solutions rely on external passive components to control the operational set-points in the IC.

The Mixed-Signal MCU typically comprises an 8051-based micro-controller with various Analog-to-Digital Converter (ADC) modules, comparators, and in some cases filter modules. The MCU accurately controls timing, performs complex calculations and transformations, and enables communications directly with an external controller.

High voltage solutions separate the electronics using either of these approaches and use external transistors and isolation.

In order to control the speed of the motor to the command given (either voltage or PWM duty cycle), an error signal is developed. The theoretical method is to measure slope of the BEMF signal as the rotor passes the stator coil and use that information to determine the position of the rotor. The idea is if the BEMF signal if offset from its midpoint, this indicates the rotor is deviating from the electrical commutation. If the BEMF signal is too high and early, this indicates the rotor is spinning faster than the electrical commutation, and the next commutation period must be lengthened. Likewise, a BEMF signal that is too low and late indicates the rotor is spinning slower than the electrical commutation, and the period should be shortened. Developing this type of error signal in digital circuitry in the past has required a microcontroller or microprocessor, and a high speed Analog-to-Digital converter (ADC). The alternative was to develop analog circuitry to generate reference pulse trains, and use analog components to phase lock to the BEMF signal.

These solutions have provided a degree of power savings, but not at the levels anticipated. Most, if not all of these solutions are designed for a specific motor type, and do not translate well from application to application, or even from manufacturer to manufacturer. Each motor type requires tuning capacitors to adjust the commutation and startup frequencies, as well as crossover and dead-time locations in the commutation sequence.

The single largest shortfall of prior art solutions is the lack of power savings realized. All literature discusses power savings in the range of 15-30% over other solutions, with as much as 50% in the mid-range of the motor being driven. While some application literature discusses techniques to reduce the acoustic noise produced when switching the stationary electromagnets using PWM methods, there is no mention of the additional power required to drive the motor coils in this manner. The idea is to reduce the overall inductive spikes caused when the drive transistors are turned off. The literature contends switching the coils at a rate much, much higher than the commutation frequency will "soften" the switching and reduce the acoustic signature. Depending on the amount of time needed to "soften" both the rising and falling edges, as much as 30% of the overall time finds all three drive transistors conducting, increasing the current consumption by ⅓, since all 3 coils are conducting.

Another source of power inefficiency in some prior art solutions is the lack of "differential commutation", meaning both the high- and low-side transistors are switched off simultaneously, as a method to control the rotational speed. In a classic configuration, the high-side of the motor is connected directly to the power source.

Some implementations do not control the frequency or duty cycle of the PWM signals going to the drive transistors, but rather allow the incoming PWM to modulate the signals directly. The inability to limit either frequency or duty cycle means the motor is not being driven optimally for a given operating point, but is under the control of an external device that may or may not be aware of the motor limitations. This will cause the motor to use more current than required, producing additional heat that must be removed from the system.

The issue of over-current/lock rotor has also not been properly addressed in some prior art solutions. The currents used are sufficient to damage the motor windings, and without a feedback method, a timer must expire before the damaging condition can be detected, and corrected. In some solutions, there is no provision for this event, and the motor will continue to drive to destruction. The prior art solutions use a brute-force method to drive the motor coils during start-up, and may last several seconds, drawing several times the normal operating current. The period of time when this occurs is referred to in the literature as the Forced Commutation phase of spin-up. This is one of the drawbacks of the BEMF commutation method. Until the motor spins sufficiently fast enough to generate a BEMF signal, the motor is driven open loop, at a pre-determined frequency and PWM duty cycle, putting undue stress on the motor components.

Therefore, improvements in motor design and operation are desired.

When cooling any computing platform, power is necessarily consumed to remove heat produced by other components in the system. Traditionally, this has not been a large concern, as the platforms consumed much more power than the fan used in removing the heat. As the power consumption of all platforms is reduced, the cooling system consumes power that could either be used to extend battery life in laptops, or to reduce the carbon footprint of server systems. Therefore, improvements in motors used in cooling systems are also desired.

SUMMARY OF THE INVENTION

Various embodiments are presented of a system and method for controlling a brushless three-phase DC motor. The motor may be an electronic motor, and may include a rotor having one or more permanent magnets. The one or more permanent magnets may be physically positioned in- or out-board of the stationary section of the motor, referred to as the stator, which may include a plurality of electromagnets. The motor may include a voltage sensor configured to measure a voltage induced across one or more of the electromagnets. The voltage sensor may be part of the electromagnet. Each electromagnet may include such a voltage sensor, or alternatively, a voltage sensor may be usable to measure voltage for some or all of the electromagnets. Alternatively, the motor may comprise one or more Hall sensors or other equivalent sensors for measuring voltage.

The system may include logic for controlling the operation of the motor. The logic may be analog or digital, e.g., the logic may include one or more state machine based controllers or one or more application specific integrated circuits. The motor may instead (or in addition) include a processor, such as a microcontroller, and a computer accessible memory medium storing program instructions executable to control the motor. The processor may be configured to execute program instructions from the memory medium to control the motor.

The logic may be configured to iteratively perform the following steps.

The method may calculate a pulse-width modulation (PWM) duty cycle. The PWM duty cycle may be calculated based on a minimum duty cycle and an input command. The input command may be scalable from the minimum duty cycle to a maximum duty cycle. The input command may be updatable at an adjustable interval, such as a number of iterations of the method, or an amount of time. The adjustable interval may be adjusted based on either 1) a number of intervals that have occurred since initiation (e.g. an initial iteration) of the method, or; 2) an amount of time that has occurred since initiation of the method; or 3) an estimated or calculated speed of the motor.

A voltage may be measured at a first expected zero crossing value. In one embodiment, the voltage induced by rotation of the rotor may be sampled at a first expected zero crossing value. The voltage may be induced across an undriven electromagnet of the plurality of electromagnets. Sampling this induced voltage produces a first sampled voltage value. The method calculates an average of a plurality of sampled voltage values. The plurality of sampled voltage values may include voltage values sampled at a plurality of prior expected zero crossing values and the first sampled voltage. The first sampled voltage value may then be subtracted from the calculated average to produce a delta zero crossing error.

The delta zero crossing error may be multiplied by a first constant to produce a representation of an angular velocity, where the first constant may represent electromechanical properties of the motor. The representation of the angular velocity may be divided by second constant, then be truncated, e.g. to an integer value. The method may then generate one or more time values based on the representation of the angular velocity. The one or more time values may include a period, e.g., an amount of time until a next commutation of the plurality of electromagnets. The one or more time values may indicate a next expected zero crossing value. The next expected zero crossing value may be the same time value as the next commutation time of the plurality of electromagnets, or they may be different time values.

The method then controls operation of the motor based on the one or more time values and the PWM duty cycle. More specifically, the plurality of electromagnets on the stator may be driven by periodic bursts of current whose frequency and power may be specified by the PWM duty cycle in such a way as to drive the rotor at a particular rotational speed, while the one or more time values may determine the commutation timing of the electromagnets on the stator, such that the electromagnetic field of the stator may remain substantially in optimal alignment with the rotor, effecting an efficient transfer of power to the rotor at that particular rotational speed.

The method described above may repeat over a plurality of iterations. In one embodiment, the next zero crossing value from the previous iteration is used as the first expected zero crossing value in the next iteration.

The above method provides significantly greater motor performance, e.g., increased efficiency, as compared to prior art designs. In particular, the above method more accurately matches the required current for a given load to the desired rotational speed by simply responding to the load, effecting more efficient use of energy. In addition, the above method may reduce the frequency with which stall conditions appear, due to the angular velocity truncation step, potentially resulting in smoother performance and additional energy savings. Further, the reduction in complexity of the method over prior art designs allows a more compact and efficient control mechanism design, which further reduces overall power usage.

Figure 1A:
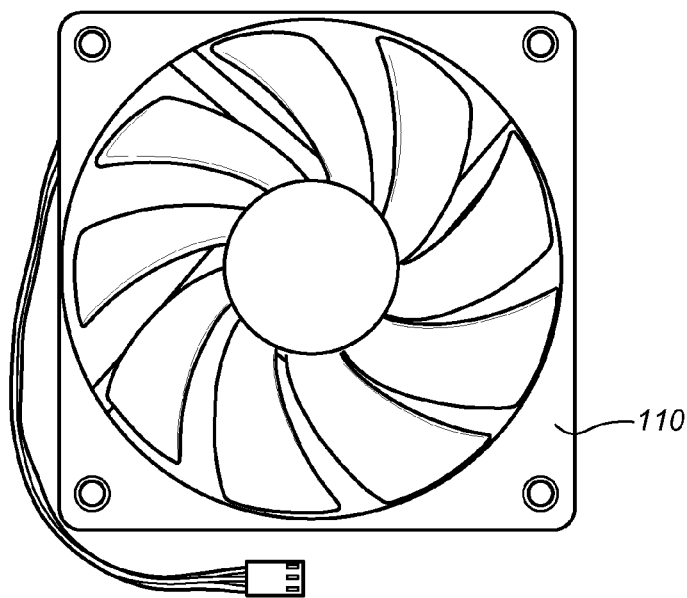
FIGS. 1A and 1B illustrate different views of an exemplary fan and fan motor according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1B:
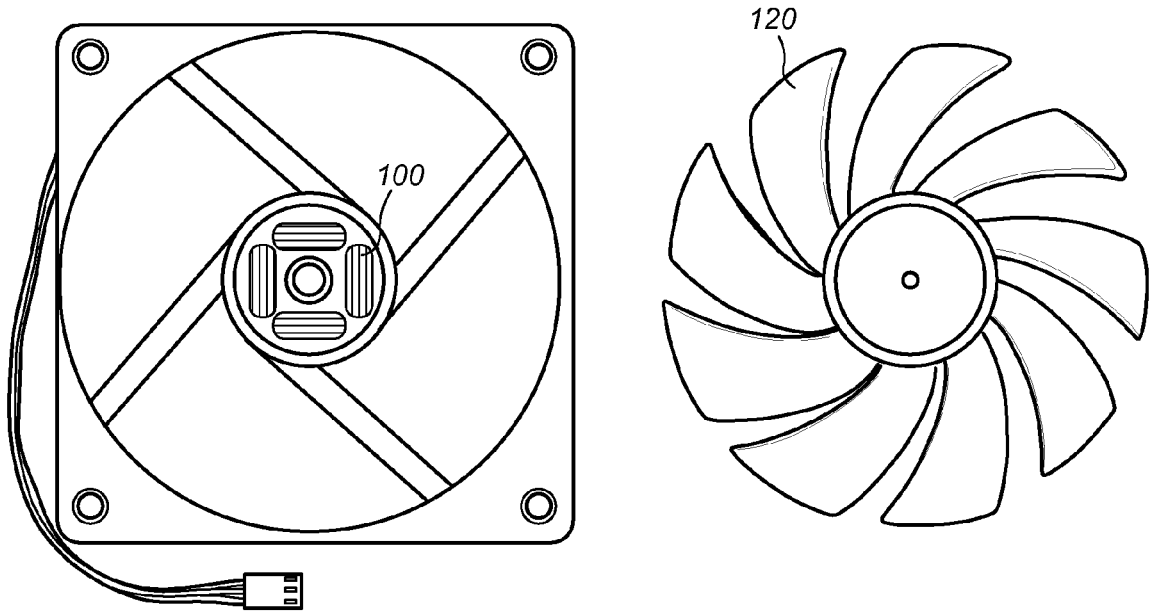

FIGS. 1A and 1B—Exemplary Fan and Fan Motor

FIGS. 1A and 1B illustrate an exemplary fan assembly 110 according to one embodiment. The fan 110 may be a cooling fan, for example a fan for use in a laptop or a desktop computer. The fan 110 may alternatively be a commercial or industrial fan, or in general any type of fan driven by a motor. The fan assembly 110 may include a motor assembly 100 as well as fan blades 120. The motor assembly 100 may comprise a motor (102, FIG. 2) as well as drive circuitry (402 FIG. 4) for controlling the motor 102.

Although FIGS. 1A and 1B illustrate a fan as the load being driven by the motor, it should be noted that the system and method for controlling a motor as described herein may be suited for driving any of various types of loads, including without limitation hard disk drives, drive motors for appliances, propellers, wheels, pumps, or other loads.

Figure 2:
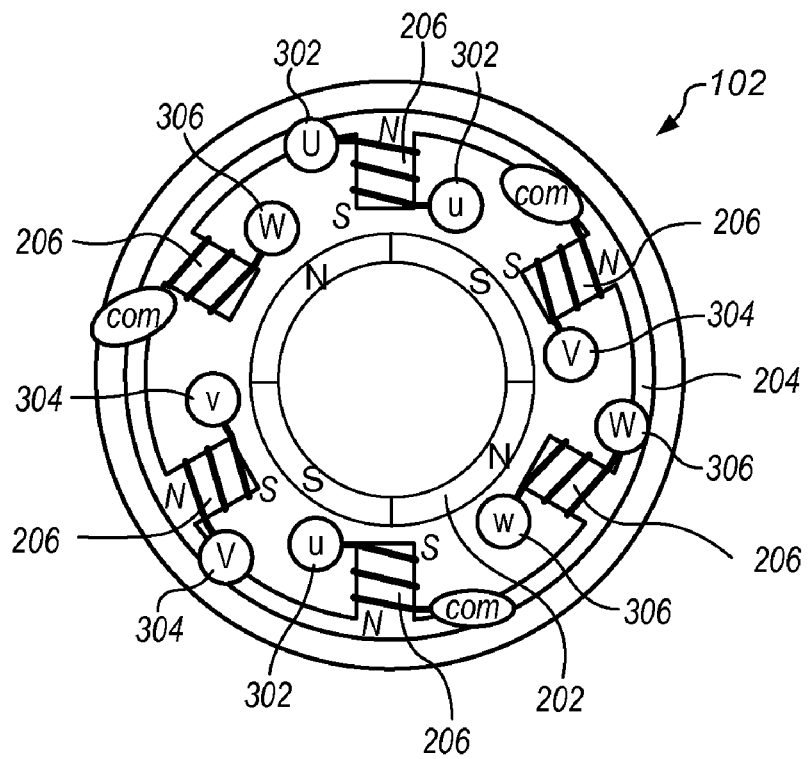
FIG. 2 illustrates a simplified diagram of a brushless four-pole three-phase electric motor according to one embodiment.

FIG. 2—Brushless Four-Pole Three-Phase Motor

FIG. 2 illustrates a simplified diagram of an exemplary brushless four-pole three-phase motor 102. The motor 102 may be electrically powered, e.g., by direct current (DC) electricity. The motor may also be electronically controlled. The motor 102 may include a rotor 202, which may include one or more permanent magnets. The rotor 202 may have four poles, as shown. Alternatively, the rotor 202 may include two, six or another number or poles. The motor may include a stator 204 comprised around the rotor 202, which may include a plurality of electromagnets 206. There may be six electromagnets 206, which may be arranged at equal spacing around the stator 204. The electromagnets 206 may be arranged as three pairs of electromagnets 206, such that each pair of electromagnets may variously be powered in different phases than the other pairs. The three pairs of electromagnets 206 may be connected in a "Y" configuration. Thus the motor 102 may be a three phase motor. The motor 102 may be brushless, e.g., may not include any brushes connecting current to the rotor 202. Additionally, the motor 102 may be sensor-less, e.g. may not include a discrete rotor position sensing mechanism such as one or more Hall sensors. In another embodiment, the motor 102 includes Hall sensors. Two of the three pairs of electromagnets on the stator 204 may be driven to induce or maintain rotation of the rotor 202 at any given time. The motor 102 may then utilize one of the undriven electromagnets of the stator 204 to indirectly detect the position of the rotor 202 (or may use Hall sensors). The phases of the stator 204 may be driven in a pattern ideally configured to induce rotation of the rotor 202. The polarity of the electromagnets 206 may be periodically commutated as part of this pattern.

Figure 3:
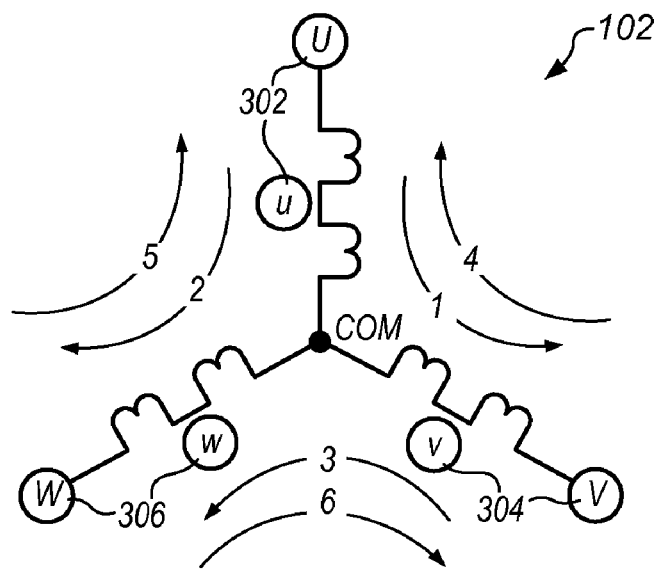
FIG. 3 illustrates a commutation pattern of a brushless three phase electric motor according to one embodiment.

FIG. 3—Commutation Pattern of a Brushless Three-Phase Motor

FIG. 3 illustrates a simplified circuit diagram depicting a commutation pattern of a brushless three phase motor according to one embodiment. The motor 102 may be a brushless, three-phase DC motor as described above. The electromagnets 206 may be connected in a "Y" configuration as shown. The motor 102 may also be a sensor-less motor as described above, e.g. may utilize an undriven stator electromagnet to indirectly detect the position of the rotor (or the motor 102 may include Hall sensors). The motor 102 may determine the timing of each commutation of the commutation pattern according to an embodiment of the method described herein. To control rotation of the rotor 202, two pairs of the electromagnets on the stator 204 may be driven at any one time. A given pair may be driven on the 'high side' or the 'low side', indicating in which direction current is being run through the windings of that pair of electromagnets. Depending on the number of poles in the rotor, the electromagnets of a pair may be wound in the same direction or in opposite directions. For example, with a four pole rotor (as shown in FIG. 2), the windings may be configured such that the opposite sides of an electromagnet pair may present the same polarity (e.g., 'S') to the rotor, while with a two pole rotor, the windings may be configured such that the opposite sides may present opposing polarity (e.g., one 'S', one 'N'). Thus in some cases the convention used to define the polarities indicated by 'high side' and 'low side' may depend on the rotor magnetics. Other naming and/or driving conventions may also be possible.

A commutation cycle may include six phases. The phases may correspond to the numbered arrows in FIG. 3. In FIG. 3, each arrow points from the high side driven pair to the low side driven pair. Thus for example, '1' may indicate that in the first phase of the cycle, the 'U' pair 302 of electromagnets may be driven on the high side, while the 'V' pair 304 of electromagnets may be driven on the low side, while the 'W' pair 306 of electromagnets may remain undriven. '2' then would indicate that in the second phase of the cycle, the 'U' pair 306 may again be driven on the high side, while the 'W' pair 304 may be driven on the low side, and the 'V' pair 302 may be undriven. Each of the remaining numbered phases would operate in a similar manner to create a full commutation cycle which could be repeated to increase, maintain, or otherwise affect rotation of the rotor.

If the motor 102 is a DC powered motor, rotational speed may be controlled by means of pulse width modulation (PWM) of the electromagnets. Generally speaking, a PWM duty cycle may indicate how fast the rotor 202 should rotate. More specifically the PWM duty cycle may specify how often and with how much power to drive the electromagnets of the stator.

As noted above, one pair of electromagnets may remain undriven during each phase of the commutation cycle. If the rotor 202 is rotating, the movement of the one or more permanent magnets in the rotor 202 past the undriven electromagnet will cause an induced voltage in the undriven electromagnet. Thus during each phase of the commutation cycle, whichever pair of electromagnets is undriven may be used to sample the voltage induced by the rotation of the permanent magnet(s) in the rotor 202 in one or both of those electromagnets. This is also known as BEMF sampling. The sampled voltage may be used to help determine the present location and/or rotational velocity of the rotor 202. The sampled voltage or information inferred from the sampled voltage may be used to control future commutation timing or other aspects of motor control according to various embodiments. As noted above, in one embodiment the motor 102 includes Hall elements (Hall effect sensors) to detect the absolute position of the rotor, and this embodiment BEMF sampling may not be used.

Figure 4:
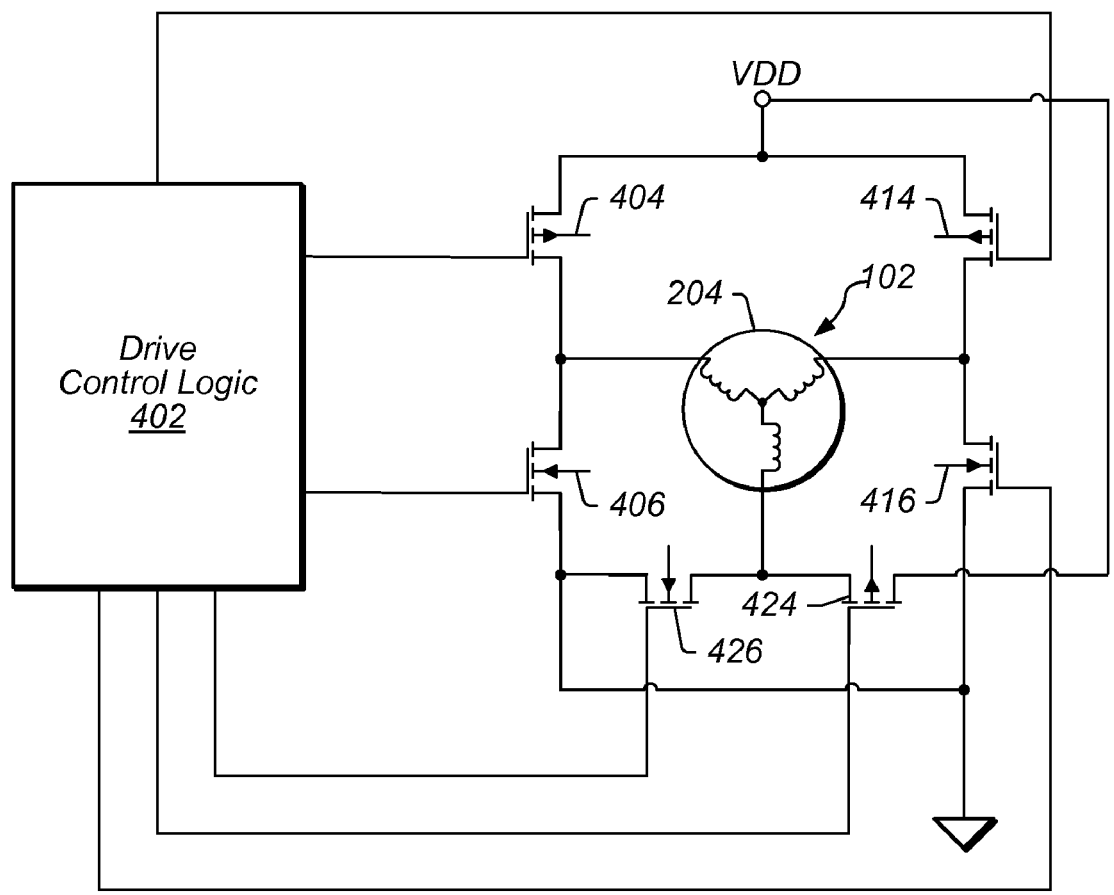
FIG. 4 is a circuit diagram of a motor with drive control logic according to one embodiment.

FIG. 4—Circuit Diagram of a Motor with Drive Control Logic

FIG. 4 illustrates a simplified circuit diagram of a motor and its drive control logic 402. The motor may be a sensor-less, brushless, three-phase motor as described above and illustrated in the various Figures. As shown, the motor may include a stator 204, which may include three pairs of electromagnets. Each pair of electromagnets may have a corresponding pair of transistors, e.g., field effect transistors (FETs). The transistors may be configured such that each pair of electromagnets is effectively bipolar, e.g., the polarity may be reversible. In other words, for each electromagnet pair, one transistor may drive the pair on the high side, or the other transistor may drive the pair on the low side. For example, FET 404 may be the high side transistor for the 'U' pair 302, while FET 406 may be the low side transistor for the 'U' pair of electromagnets 302. Similarly, FETs 414, 416 may be the respective high and low side transistors for the 'V' pair of electromagnets 304, while FETs 424, 426 may be the respective high and low side transistors for the 'W' pair of electromagnets 306. In addition to the particular embodiment shown, any number of other wiring configurations (e.g. using a different number or type of transistor) may also be possible.

The transistors for each pair of electromagnets may be controlled by drive control logic 402. The drive control logic 402 may be electronic logic configured to perform various operations as described herein, such as sampling voltages induced across the electromagnets, performing calculations (e.g. simple integer math or more complex operations) to determine values used for controlling the electromagnets, and/or sending control and/or power signals to the electromagnets. The drive control logic 402 may also receive signals from one or more outside control devices, such as a fan speed control device. For example, a fan speed control device might periodically send an input command indicating a desired change in motor velocity based on some outside condition, such as an ambient temperature, which the drive control logic 402 might incorporate into its control calculations. Other outside control devices are also envisioned. Alternatively, such control devices may be incorporated into the drive control logic 402 itself.

In addition to any steady state or natural commutation control logic functions described herein, the drive control logic 402 may have logic for controlling the motor under other conditions; for example, the drive control logic 402 may include logic for a DC excitation operation to align the rotor to a known position prior to beginning rotation; logic for a forced commutation operation to begin rotation of the rotor; logic for stopping rotation of the rotor; logic for determining if a stall condition exists; and/or logic for other functions, as well as logic for switching from one function to another at an appropriate time.

The drive control logic 402 itself may be any of various types of logic, e.g., analog or digital, or a combination thereof. For example, the drive control logic 402 may be implemented as a processor, e.g. a microcontroller, executing instructions comprised on a memory medium; a state-machine based digital controller; a Field Programmable Gate Array (FPGA) and/or a mixed signal application specific integrated circuit (ASIC). Alternatively, the drive control logic 402 may include any combination of the above. The drive control logic may thus be implemented using any of various digital or analog techniques, or a combination thereof, as would be apparent to one of ordinary skill in the art.

Figure 5:
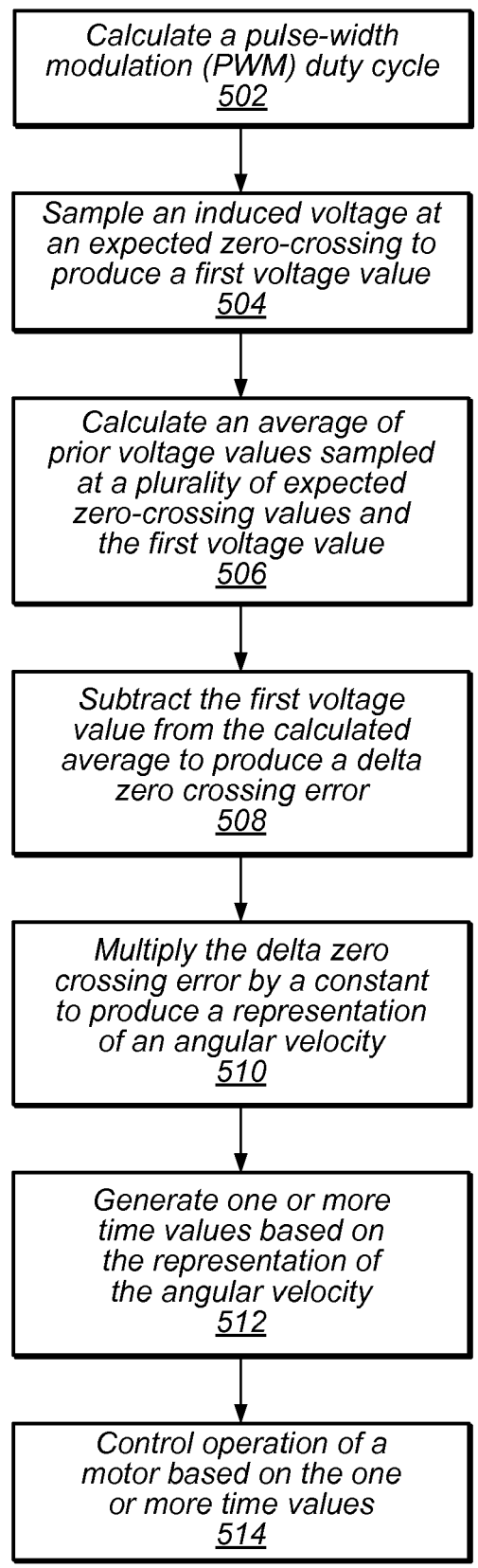
FIG. 5 is a flowchart diagram describing a method for operating a sensor-less, brushless three phase motor according to one embodiment.

FIG. 5—Flowchart Illustrating a Method for Controlling Steady State Operation of a Motor FIG. 5 illustrates a method for controlling steady state operation of a motor according to one embodiment. A steady state operation of the motor may also be known as natural commutation operation of the motor. Steady state or natural commutation may refer to operation of a motor once the rotor is already spinning. In other words, natural commutation may refer to maintaining or adjusting the rotation speed of the rotor once it is already in motion. In some embodiments a motor may use a different method (e.g. different control logic) for initiating rotation of a stationary rotor than it may use for maintaining or adjusting the rotation speed of an already rotating rotor.

The motor 102 may be a brushless, three-phase motor as described above and illustrated in the various Figures. The motor 102 may thus include a rotor 202 which may include one or more permanent magnets. The one or more permanent magnets on the rotor 202 may include four poles; alternatively the permanent magnet may include two, six, or another number of poles. The motor may also include a stator 204. The stator 204 may be positioned around the rotor 202, and may include a plurality of electromagnets 206. For example, there may be six electromagnets 206 on the stator 204, which may operate as three pairs of electromagnets 206. Each pair 302, 304, 306 of electromagnets may be positioned opposite one another. The plurality of electromagnets 206 may be evenly distributed around the stator 204. Various ones of the electromagnets may be driven with various voltages and currents at different times and/or in different phases to electromagnetically induce the rotor 202 to rotate.

The method illustrated in FIG. 5 and described below may operate in iterative fashion according to various embodiments. As the rotor 202 rotates, control of the motor 102 may need to be adjusted frequently, e.g. to commutate the electromagnets at appropriate times for efficient motor operation. Thus some or all of the steps of the method described below may be repeatable according to various embodiments over an indefinite number of iterations during the operation of the motor 102.

The method may be implemented by logic 402 comprised in the motor assembly 100. For example, the logic 402 (which implements the method described herein) may comprise a processor, e.g., a microcontroller, executing instructions comprised on a memory medium; a state-machine based digital controller; and/or a mixed signal application specific integrated circuit (ASIC). Alternatively, the method may be implemented by any combination of the above.

In 502, a pulse-width modulation (PWM) duty cycle may be calculated. The PWM duty cycle may be calculated based on a minimum duty cycle and an input command. The minimum duty cycle may be the minimum duty cycle required to drive the coils of the electromagnets on the stator. The input command may be scalable from a zero value, or, in some embodiments, a small non-zero value, in which case the PWM duty cycle would be (either exactly or approximately) the minimum duty cycle, to a maximum value, in which case the PWM duty cycle would drive the motor with the maximum drive current available for the motor. An initial input command may be preset, or alternatively may be received from a control device. The input command may be updated periodically by the control device. The period at which the input command is updated may be longer than the period at which the method may be iterated. In any iterations of the method between updates of the input command, the most recent update of the input command may continue to be used for the PWM duty cycle calculations.

An update to the input command may indicate a desire to maintain, increase, or decrease the rotational speed of the motor 102. The control device sending the input command and/or input command updates may be a control device, e.g., a fan speed control device. If for example the motor 102 is driving a cooling fan 110, the fan speed control device may update the input command based on one or more temperatures measured in the location to be cooled. Thus in this example, if the temperature measured was too hot, the control device might send an input command to increase the PWM duty cycle drive, e.g. to increase the rotational speed of the rotor 202, thereby increasing air circulation and removing the excess heat. It should be noted that other types of control devices, e.g., for other types of motor loads, are also envisioned. In 504, an induced voltage is sampled at an expected zero crossing to produce a first voltage value. As the rotor 202 (e.g., including a permanent magnet) rotates, it may induce a voltage in each of the plurality of electromagnets 206 as it passes each in turn. When, in the course of driving the motor 102, one of the electromagnets is not actively being driven, e.g. may be unpowered, it may be possible to measure the voltage induced by the rotation of the rotor 202 across that electromagnet. Similar induced voltages may have been sampled at a plurality of prior expected zero crossings. Based on such previous induced voltage samplings, there may be a particular time when the voltage across a particular unpowered electromagnet is expected to cross zero. Thus sampling the induced voltage at this expected zero crossing may provide information indicating the actual position and/or speed of the rotor 202. For example, a small or large positive or negative voltage may indicate that the rotor's 202 position is closer or farther in front of or behind that electromagnet than expected. Sampling of the induced voltage at this expected zero crossing is referred to herein as the "first voltage value". The first voltage value may then be used in subsequent steps to determine any adjustments in motor control.

In an alternate embodiment, Hall elements (Hall effect sensors) are used to detect the absolute position of the rotor, instead of BEMF sampling. In embodiments of the invention which use Hall sensors, certain of the signal processing described herein may be slightly modified. For example, the calculations below would still be performed, but may include an offset and different gain values. As one example, the Hall sensor measurement may be processed to appear as a BEMF signal, and the method described below may then be performed.

In 506, an average of prior voltage values sampled at a plurality of expected zero crossing values and the first voltage value is calculated. The induced voltage across inactive electromagnets may have been similarly sampled at previous expected zero crossings. Thus it may be possible to calculate an average of several previously sampled voltage values together with the first voltage value. For example, the average may include voltage values sampled over a full commutation cycle, e.g., if there are six electromagnets and six phases to a commutation cycle, 5 previous sampled voltage values may be averaged with the first sampled voltage value. The calculated average thus provides an indicator of the recent average error when calculating expected zero crossings.

In 508, the first voltage value is subtracted from the calculated average to produce a delta zero crossing error. Real-world conditions inside any motor will be non-uniform; in other words, any fields inside the motor 102, and/or the electromagnets 206, permanent magnets, and other parts or aspects of the motor 102 may not ever be completely uniformly identical. By establishing a non-zero average (in step 506) and subtracting the first voltage value from that average (in step 508), this operates to balance any effects of real-world non-uniformity in a given sampled voltage over an entire commutation cycle. Thus using this delta zero crossing error (after further calculations) as part of motor control may be a way to keep the rotor magnetics substantially optimally aligned to the driving stator electromagnetics.

In 510, the delta zero crossing error is multiplied by a first constant to produce a representation of an angular velocity. The first constant may represent electromechanical properties of the motor and/or properties of the load being driven. Various motor architectures have different electromechanical properties. Additionally, if the motor 102 is driving a load, the properties of the load may need to be considered. For example, if the motor is driving a fan, the load may bear differently on the motor than if the motor is driving a wheel. The first constant may be determined based on the electromechanical properties of the particular motor and load being driven. The first constant may be determined such that when it is multiplied with the delta zero crossing error, it will produce a representation of an angular velocity. The angular velocity represented may be usable (e.g., directly or indirectly) to run the motor 102 at an ideal efficiency given the current state of the motor 102, as represented by the first sampled voltage value and the previously sampled voltage values.

In one exemplary embodiment, an optimal value of the first constant may be determined experimentally for a given motor design. The value of the first constant may for example be determined by first setting the constant at an arbitrary value (e.g., arbitrarily low value) then observing the tachometer frequency and/or the current ripple (e.g., by using an oscilloscope) during operation of the motor as the value of the first constant is varied, and eventually determining a value of the first constant at which the variance in tachometer frequency and/or current ripple are minimized. In some embodiments, the value of the first constant may be determined in part in conjunction with a value of a second constant, as described below. The tachometer frequency and current ripple may be indicators of how well the zero crossing error predictions balance over a commutation cycle. In other words, if the tachometer frequency is unstable or there are large ripples in the motor current, it may indicate that the electromagnets are not being commutated at even intervals, which may be an indication that the control loop is unstable (e.g. overadjusting or underadjusting). Thus determining a value of the first constant that minimizes the tachometer frequency variance and/or current ripple may optimize the stability of the control loop. In some embodiments the optimal value of the first constant may produce less than 1% variance in tachometer frequency and current ripple. In some embodiments, once an optimal value of the first constant is experimentally determined for a given motor design, the first constant may be used for any motor of that same design.

In some embodiments the value produced by multiplying the delta zero crossing error by the first constant may then be divided by a second constant, for example in a system utilizing integer math. One advantage of dividing by a second constant (if using integer math) may be to truncate (i.e., slightly reduces) the value. By truncating this value, the motor 102 may operate at slightly below peak efficiency. This may be desirable in order to retain some capability to adjust for any environmental condition changes, such as a need for additional torque, without causing a stall condition. Using integer math may be beneficial in its own right because it requires less complex computational circuitry. Utilizing the truncation capability, which is inherent to integer math division, may provide this additional benefit. The second constant may be determined in conjunction with the first constant, e.g., to both minimize tachometer frequency variation and current ripple and to truncate the value at an appropriate resolution. Alternatively, the second constant may be optimally determined for all motors (e.g. the ideal second constant may not depend on specific motor type), while the first constant may be determined in view of the second constant. The second constant may also initially be experimentally determined, to optimize the efficiency of the motor. For example, if the second constant is too small, the drive control method may become unstable easily (e.g., stall conditions may occur relatively frequently). On the other hand, if the second constant is too large, the efficiency may be reduced. Thus an optimal intermediate value resulting in good efficiency and stability may be determined experimentally. Thus in some embodiments, the value after division by the second constant may be the representation of the angular velocity.

According to one embodiment, an example of the delta zero crossing error might be −14. The first constant might be 30, while the second constant might be 16. Thus step 510 might include the calculations int(−14*30)=420 and int(420/16)=26. In this example the representation of the angular velocity based on the delta zero crossing error might then be −26.

In 512, one or more time values are generated based on the representation of the angular velocity. The one or more time values may represent a period, for example, the period of time for a portion of a revolution of the rotor. The period could be 7.5 degrees or $\frac{1}{48}^{th}$ of a mechanical revolution. The one or more time values may represent an amount of time before the next commutation of the electromagnets. In other words, the one or more time values may represent the next expected zero crossing value.

In some embodiments the representation of the angular velocity may be used in conjunction with one or more other values to generate the one or more time values. For example, the input command may be used to generate another representation of an angular velocity value. In such a case, the input command's angular velocity value may represent a base angular velocity (e.g., the rotational speed which the PWM duty cycle should produce), while the delta zero crossing error's angular velocity value may represent an adjustment to correct for any offsetting of the actual rotor position. Thus to continue the previous example, an example of an angular velocity value based on the input command might be 48. The method might subtract the delta zero crossing error's angular velocity from the input command's angular velocity to produce a final (representation of an) angular velocity value. Using the previous example, this might in one embodiment include the calculation int(48−(−26))=int(48+26)=74.

In some embodiments one or more further calculations may be used in generating the one or more time values. For example, there may be a third constant used to scale the final angular velocity value to a time value. The third constant may simply be a conversion factor, essentially used to change the units from those of angular velocity (e.g., radians per millisecond) to time (e.g., milliseconds). To again continue the previous example, the third constant might in one embodiment be 9000, and the calculation might be int(9000/74) =121. Thus in this example, there might be one time value produced, e.g., a rotational period, which might be 121. While this is one specific example, it should be noted that in other embodiments, other calculations may be used in addition to or instead of the ones just described to generate the one or more time values, e.g. using other values. In addition, it should be noted that other time values (e.g., in addition to or instead of a rotational period) may also be generated as part of step 512.

In 514, the operation of the motor 102 may be controlled based on the one or more time values and the PWM duty cycle. As noted above, the one or more time values may represent an amount of time before the next commutation of the electromagnets. The one or more time values may also represent the next expected zero crossing value. These values may be the same value, or different values. The electromagnets may be commutated based on the value, e.g. at a time indicated by the value(s). The next zero crossing voltage value may also be sampled based on the value, e.g. at a time indicated by the value(s).

As previously noted, in some embodiments the method shown in FIG. 4 may be repeated, e.g., over a plurality of iterations. One possible way of enabling continuous reiteration of the method could be performed as follows. One of the one or more time values might be a next expected zero-crossing value. The following iteration might then include using the next expected zero crossing value as its first expected zero crossing value. The PWM duty cycle might be calculated based on the minimum duty cycle and the same input command as the previous iteration, if the input command has not been updated. Alternatively, the PWM duty cycle may be calculated based on the minimum duty cycle and an updated input command. The remaining steps of the method may then again be performed in a similar manner to produce steady state operation of the motor.

In some embodiments the method may be performed at specific regular time intervals, such as once every 1 ms. In other embodiments, the method may be performed at regular angular intervals, which may be at variable time intervals. For example, the method may be performed 12 times per mechanical revolution, or once every 30 degrees of rotation; this interval would be a variable amount of time depending on how fast the motor is spinning. Alternatively, the method may rely on two or more asynchronous control loops. In such cases different portions of the method may be performed at different regular (variable or specific) intervals, while the method as a whole may be performed at irregular intervals. In one set of embodiments, there may be a commutation loop which may be responsible for sampling induced voltages (e.g., step 504) at specific times, e.g., at the one or more time values generated in step 512. In some embodiments, the commutation loop may also be responsible for commutating the electromagnets (e.g., part of step 514). The commutation loop may also be responsible for calculating the delta zero crossing error (e.g., steps 506 and 508). There may also be a speed control loop that uses the delta zero crossing error to generate the one or more time values (e.g., steps 510 and 512). In some embodiments, the speed control loop may also be responsible for determining the PWM duty cycle (e.g., step 502).

The control loops may operate at different rates, e.g., asynchronously. For example, the commutation loop may operate at a variable speed depending on the speed of the motor, while the speed control loop may operate at a fixed rate, such as every 1 ms. In these embodiments, the steps of the method may not have a fixed order; for example, some steps may be repeated multiple times before others are performed. If, for example, the motor was spinning at a high rate, such as 8000 rpm, the commutation loop may commutate the electromagnets, sample a first voltage value, calculate an average of a plurality of sampled voltage values, and subtract the first sampled voltage value from the calculated average to produce a delta zero crossing error multiple times before the speed control loop gets the (most recent) delta zero crossing error and uses the delta zero crossing error to generate the one or more time values. At other (e.g., slower) motor speeds, it may also be possible that the speed control loop could cycle more often than the commutation loop, e.g., may continue to re-use the same delta zero crossing error value until the commutation loop samples a next sampled voltage and calculates a new delta zero crossing error.

The input command, as noted above, is a command that together with a minimum duty cycle, may be used to calculate the PWM duty cycle. In other words, the input command may be a means for a control device to input a desired rotational speed into the control algorithm. In some embodiments, the input command may also be used as part of the generation of one or more time values. The input command may be updated periodically. In other words, the input command may be updatable only at a specific interval. The interval may be a number of iterations of the method, for example, the input command may be updatable once every 128 iterations of the method. The interval may alternatively be a number of iterations of one of the control loops used to perform the method, for example, the speed control loop. The interval may be an adjustable interval. The interval may be adjusted, for example, after a specific number of intervals have passed since an initial iteration of the speed control loop. For example, the input command may initially be updatable after every 128 iterations (e.g. after 128 ms, in one embodiment), however, after the input command has been updated 8 times, the input command may be updatable after every successive 64 iterations, e.g. the interval may be reduced by a factor of two. The interval may alternatively be reduced by a different factor, or increased, or may be adjusted after a different number of intervals have passed; in general the interval may be adjustable in any number of ways.

The interval may be adjusted more than once, e.g., a plurality of times. For example, after 8 input command updates have been received, the interval might be reduced by a factor of two, and after another 8 (or 16, or another number) input command updates have been received, the interval might be further reduced, again by a factor of two, or by a factor of four, or by some other factor. Other adjustment criteria may also or alternatively be used to determine when the frequency with which the input command is updatable may change, for example based on an amount of time since the initial iteration of the method, based on a current rotational speed of the motor, or any number of criteria.

Each time the input command is updated, the rotational speed of the rotor may change (e.g. over the course of several iterations). This may affect the actual zero crossing values relative to the expected zero crossing values for a number of iterations of the method following the update. For this reason, especially when the motor is just starting to spin, it may be desirable that the input command may only be updated infrequently, e.g., that the adjustable interval initially be relatively long. Thus, a larger number of iterations (e.g. 128 iterations) of the speed control loop may be performed, allowing the average zero crossing error to stabilize (e.g. reach a minimum) before the input command is again updated. On the other hand, once the motor is spinning and the expected zero crossing values are relatively accurate and stable, more frequent updates to the input command may be desirable. Thus, the interval may be reduced (e.g. to 64, 32, or another number of iterations) to improve the motor's response to desired changes in the rotational speed of the motor.

Figure 6:
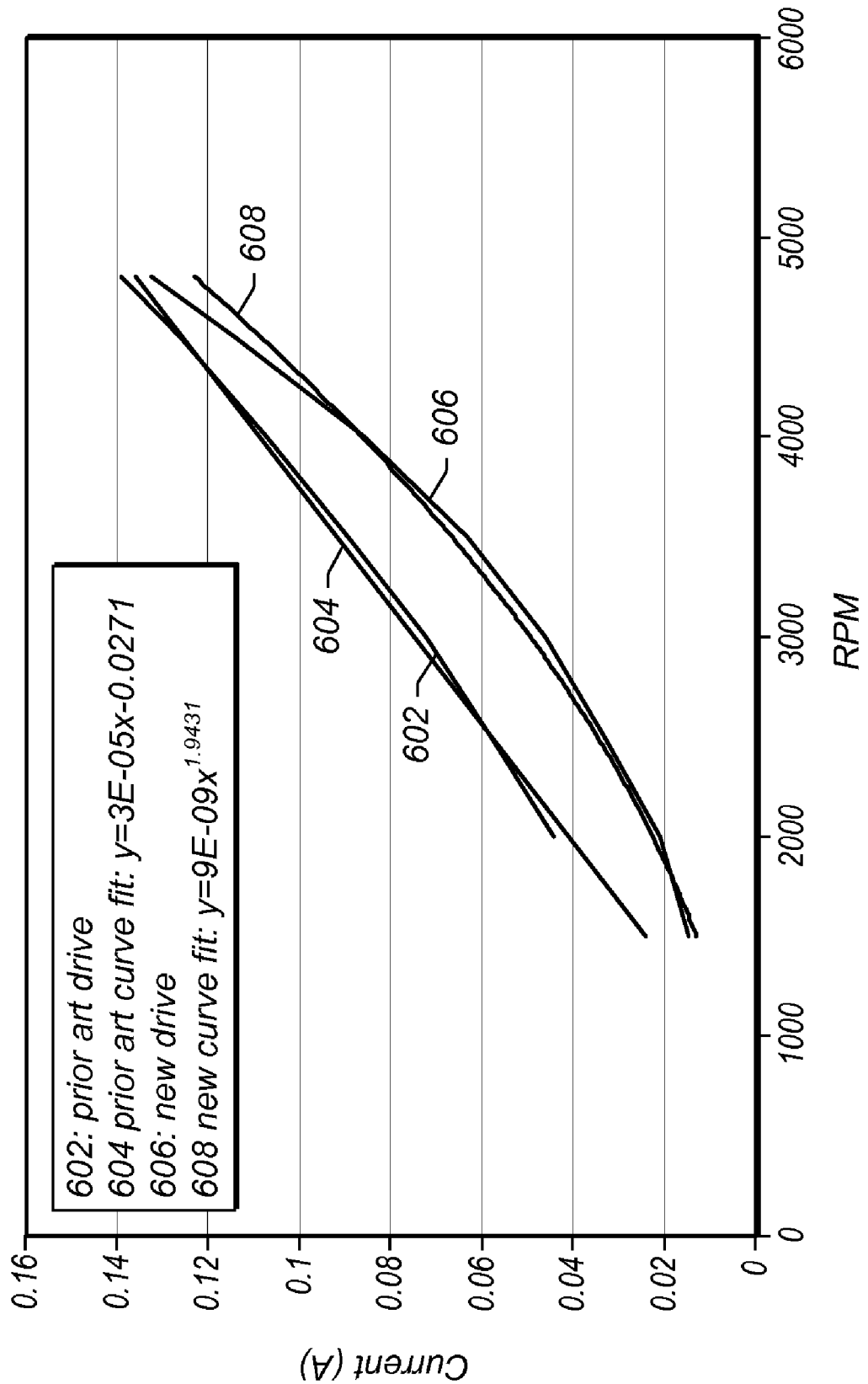
FIG. 6 is a graph depicting test results of a comparison between a prior art drive technique and a drive technique according to an embodiment of the present invention.

FIG. 6—Graph Comparing Test Results of Drive Techniques

FIG. 6 illustrates a graph comparing the tested performance of two drive techniques. The graph shows current RPM vs. DC Motor current. Each drive technique was used to control identical motors, e.g. the same model motor. The motor was tested using an existing prior art driver 606 and using a "new" driver 602 according to an embodiment of the present invention. The prior drive technique configured the stators for single phase operation, while the "new" drive technique configured the stators for three phase operation. Curve fits 604, 608 are also shown for each result. The new driver's results show significant power savings over the prior art driver's results. It is also worth noting that the best curve fit for the new driver shows a square-load response 608, as compared to the prior art driver's linear response 604. It is believed that the power savings shown are achieved in part by matching the response to the load without a traditional control loop.

Figure 7:
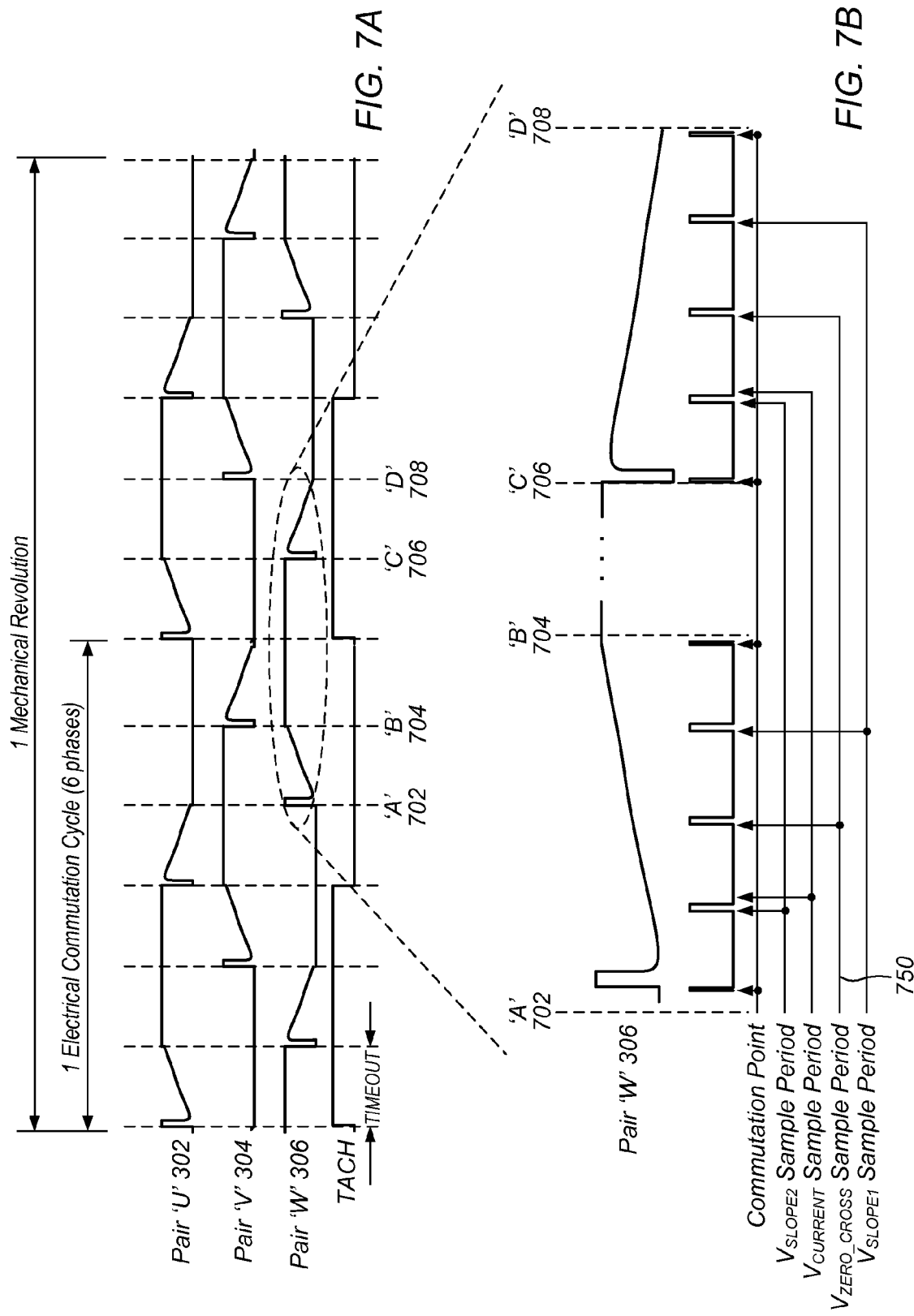
FIGS. 7A and 7B illustrate motor drive signals and timing according to one embodiment.

FIGS. 7A and 7B—Motor Drive Signals and Timing

FIGS. 7A-7B illustrate motor drive signals and timing according to one embodiment. In the embodiment shown, the rotor may be a four pole rotor, such that one mechanical revolution takes two electrical revolutions (or commutation cycles). In 7A, the drive/commutation pattern for each coil is shown over the course of one mechanical revolution of the rotor. Each pair of electromagnets ('U' 302, 'V' 304, 'W' 306) may be driven with the same pattern, but at a different phase than the other pairs of electromagnets. Each dashed line marks the end of a previous timeout period and the beginning of a next timeout period, e.g. from 'A' 702 to 'B' 704 would be one timeout period, while from 'C' 706 to 'D' 708 would be another timeout period. At the beginning of each timeout period a pair of electromagnets may be commutated.

FIG. 7B shows a blown-up portion of the drive cycle for pair 'W' 306, beginning at time 'A' 702 and ending at time 'D' 708. In the embodiment shown, just prior to time 'A' 702, electromagnet pair 'W' 306 was being driven on the "low side". At time 'A' 702, the pair is commutated and may then remain undriven until the next timeout period begins at time 'B' 704. While pair 'W' 306 is undriven, one or more induced voltage samples may be taken. These sampled voltage values may be voltages induced by rotation of the permanent magnet of the rotor (BEMF) as previously discussed. For example, the time 'Vzero_cross' 750 between time 'A' 702 and time 'B' 704 may be an expected zero crossing value, and thus the voltage at that time may be sampled. This may be the first sampled voltage used in the method shown in FIG. 5 to determine an amount of time until a next commutation and/or until a next expected zero crossing value (e.g. which might be sampled across pair 'V' 304 in this example). In other embodiments, a voltage sampled at 'Vzero_cross' 750 may be the first sampled voltage of the method of FIG. 5, and may be used to generate the timeout value(s) as shown in FIGS. 7A-7B, which may be one of the one or more time values of the method of FIG. 5.

As shown in FIG. 7B and noted above, in some embodiments one or more other voltages may also be sampled from electromagnet pair 'W' 306 in the period between time 'A' 702 and time 'B' 704. These values may include one or more samplings of the slope of the induced voltage and/or one or more samplings of the induced current and/or the motor current. In some embodiments these sampled values may be used by the drive control logic to check for stall conditions or other indications of non-steady state motor conditions or for other drive control functions.

At time 'B' 704, pair 'W' 306 may be driven on the "high side". Pair 'W' 306 may continue to be driven "high" through the two timeout periods between time 'B' 704 and time 'C' 706. In this time, first pair 'V' 304 may be undriven and used to sample induced voltages and/or currents while pair 'U' 302 may be driven "low", then pair 'U' 302 may be undriven and used to sample induced voltages and/or currents, while pair 'V' 304 may be driven "low". At time 'C' 706, pair 'W' 306 may again be commutated and undriven for the timeout period lasting until time 'D' 708. During this timeout period one or more voltages including at Vzero_cross 750 may again be sampled on pair 'W' 306. Then at time 'D' 708, pair 'W' 306 may be driven "low".

FIG. 7A depicts two full commutation cycles for one mechanical revolution, which as noted above may correspond to a motor utilizing a four pole rotor. In other embodiments, e.g., utilizing a rotor with two, six, or another number of poles, the relation of commutation cycles to mechanical revolutions may be different. In addition, other drive patterns may also be possible, for example the phases of pairs 'U' 302 and 'V' 304 could be reversed to produce rotation in the opposite direction. As noted above, the method of FIG. 5 may be performed iteratively; it should be noted that, indeed, according to one embodiment, FIG. 7A may depict 12 iterations of the method shown in FIG. 5, e.g. once for every timeout period.

Figure 8:
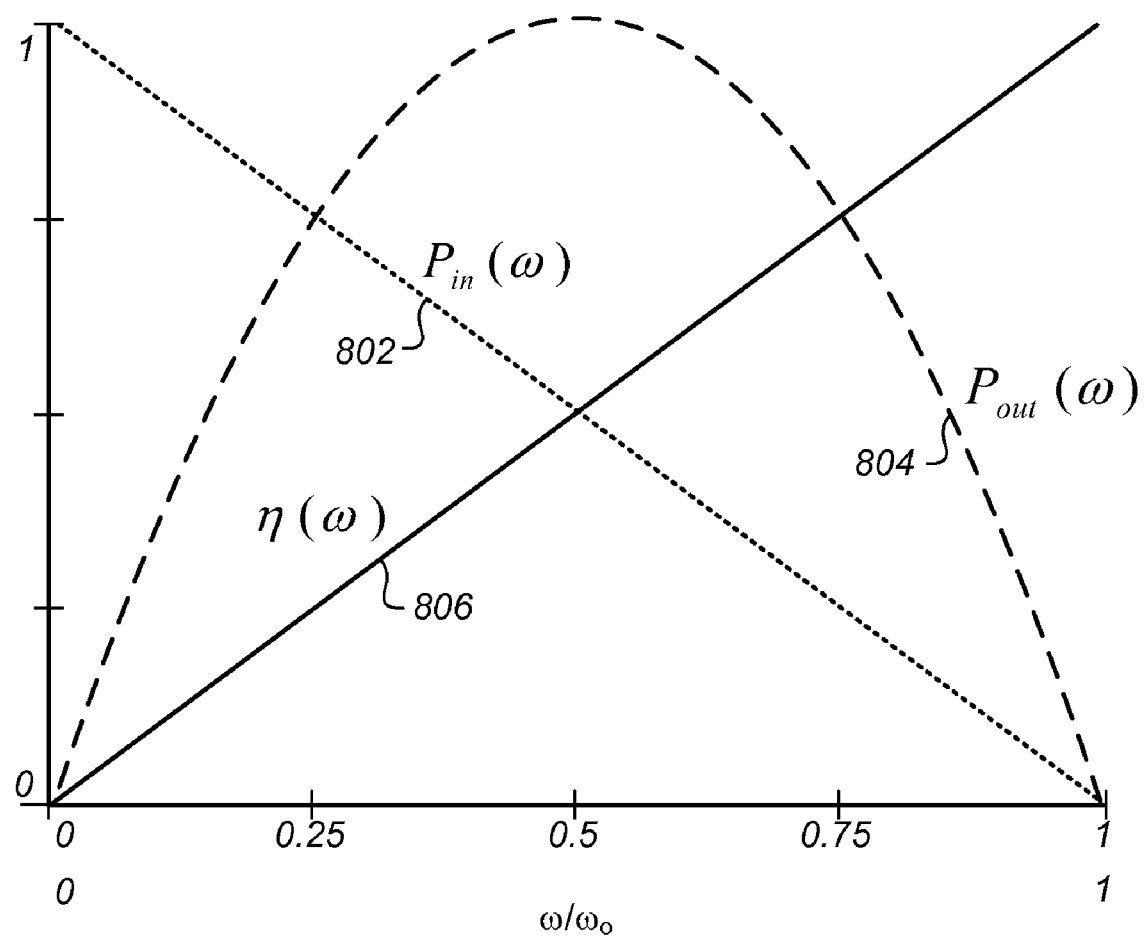
FIG. 8 is a graph depicting power transfer as a function of angular velocity.

FIG. 8—Power Transfer Graph

FIG. 8 illustrates a graph showing the power in 802, power out 804, and efficiency 806 of a motor in relation to the ratio of current motor velocity, $\omega$, to no-load motor velocity, $\omega_o$. The no-load motor velocity is where 100% efficiency is reached, but there is no torque to supply to a load. Likewise when the motor velocity is 0, the maximum torque is available, but with no velocity, no work occurs. These two conditions define the theoretical bounds of operation. In practice, $\omega/\omega_o$ values may typically vary between 0.25 and 0.75, with a realistic (e.g., when actually driving a load) ideal in the vicinity of 0.75 to achieve good efficiency without giving up too much torque.

Figure 9:
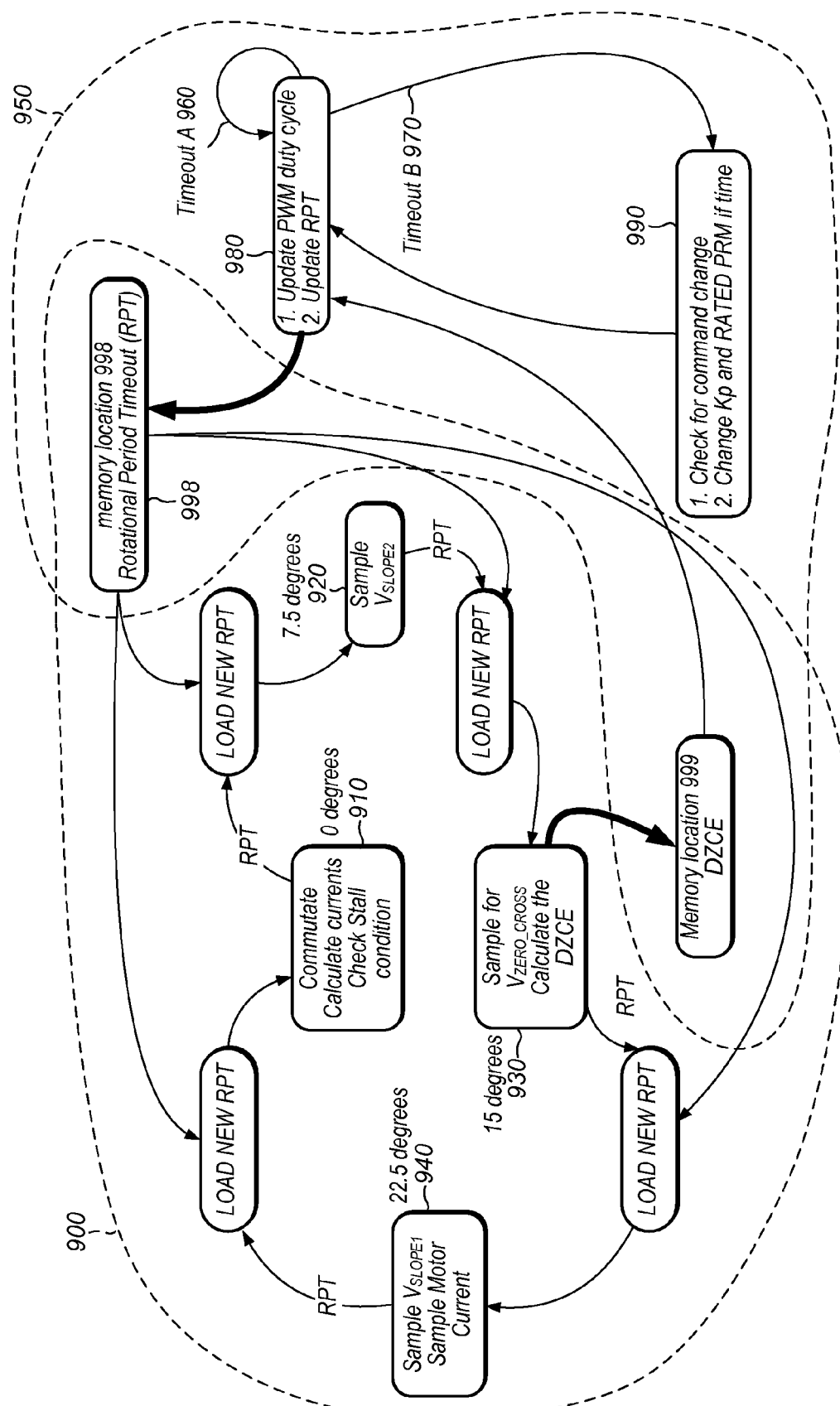
FIG. 9 is a block diagram depicting drive control logic according to one embodiment.

FIG. 9—Block Diagram of Drive Control Logic

FIG. 9 is an exemplary block diagram of drive control logic for controlling natural commutation state operation of a motor according to one embodiment. The drive control logic 402 shown in FIG. 4 and described with relation to various embodiments of a sensorless, brushless, three-phase motor could for example operate as shown in FIG. 9. However, while the drive control logic shown in FIG. 9 is one exemplary embodiment of the drive control logic of a sensorless, brushless, three phase motor, other possible embodiments are also envisioned.

The drive control logic 402 may include multiple control loops, which may be synchronous or asynchronous. In the embodiments shown, there are two asynchronous control loops: a commutation loop 900 and a speed control loop 950.

The commutation loop 900 may cycle through a number of steps at regular angular intervals. For example, there may be four steps, which may be executed at 7.5 degree intervals. The cycle may thus repeat every 30 degrees, or 12 times per revolution. At 0 degrees 910, the drive logic may commutate the stator electromagnets. In addition, the drive logic may perform one or more other functions, such as calculating drive currents and/or checking for stall conditions. These other functions may be used to control, or to determine if a change should be made to, one or more other operation states of drive control, e.g., aspects other than the natural commutation operation state. For example, if a stall condition is detected, the motor drive control logic may need to switch operation from natural commutation in order to stop and restart the motor. At 7.5 degrees 920, the drive control logic may sample an induced voltage from an undriven electromagnet on the stator. In some embodiments this induced voltage may be also be used to control or determine if a change should be made to one or more other operations states of drive control rather than for controlling natural commutation state operation. The zero crossing value of the voltage induced across the undriven electromagnet may be expected to occur at 15 degrees 930, and the drive control logic may sample the first sampled voltage value at this step. The drive control logic may also calculate the delta zero crossing error and store it in a memory location 999 accessible to the speed control loop 950 at this step. At 22.5 degrees 940, another induced voltage may be sampled from an undriven electromagnet on the stator, which may also be used as part of drive control for one or more other operation states. After 30 degrees, the cycle may reset at begin again at 0 degrees 910.

As noted, the interval between each step may be 7.5 degrees (1/48 of a revolution). The time for each interval may be stored as a rotational period timeout (RPT), e.g., in a memory location 998 accessible to the commutation loop. Thus, at 0 degrees (e.g., the end of the previous RPT) the drive control logic may load a new RPT (from memory location 998) in addition to the other functions described above. At the end of that RPT, the drive control logic may perform the functions specified for 7.5 degrees, including loading a new RPT. The drive control logic may continue to cycle the commutation loop in this manner as long as the motor is operating in the natural commutation state.

The speed control loop 950 may cycle through a number of steps at regular temporal intervals. For example, there may be a timeout A 960. The timeout A 960 may be 1 ms, or any time value. In some embodiments, a typical value for timeout A 960 might be between 1-10 ms. There may also be a timeout B 970. The timeout B 970 may be 128 ms, or any time value. In some embodiments, a typical value for timeout B 970 might be 128 ms, 64 ms, or 32 ms.

The speed control loop 950 may include step 980, which may be performed after each timeout A 960. In step 980, the drive control logic may calculate the PWM duty cycle and calculate the RPT. The drive control logic may use the input command to calculate the PWM duty cycle (for example, as described in step 502 of FIG. 5), and may use the delta zero crossing error and the input command to calculate the RPT (for example, the RPT may be a time value generated according to step 512 of FIG. 5). The delta zero crossing error may be available from memory location 999, while updates to the input command may be retrieved after every timeout B 970 in step 590. Step 590 may further include changing one or more other values. For example, the drive control logic may change the proportional gain constant (Kp) and the RPM rating, in one embodiment. After calculating the RPT in step 580, the drive control logic may store the RPT in memory location 998 where it may be accessible to the drive control logic making up the commutation loop 900.

The speed control loop 950 and the commutation loop 900 may each use information provided by the other control loop. In other words, the speed control loop 950 may use the delta zero crossing error calculated by the commutation loop 900 to calculate the RPT, while the commutation loop 900 may use the RPT to control its timing for sampling the first sampled voltage value and calculate the delta zero crossing error therefrom.

Advantages of the Method

The approach described herein is much simpler in principle than most solutions because there is no predictive estimation for rotational speed and position. In a straightforward manner, the motor is aligned and forced into rotation with known periods and PWM duty cycles. At the conclusion of one mechanical rotation, the BEMF errors are used to adjust the temporal calculations while accelerating to the commanded speed. One advantage to this approach is a significant reduction in analog and digital circuitry. Certain embodiments do not require more than (P)roportional control, and in these embodiments the (I)ntegral and (D)erivative calculations required by almost all prior art solutions for PID control are not required.

Embodiments of the invention may operate to modulate both drive transistors when controlling the speed of the motor. At any point in time, one high- and one low-side transistor are active. The incoming command is used to determine the percentage of maximum rotational speed that has been commanded, but this external signal is not used to modulate the coils directly.

The simplicity of the overall design is unique. The methods employed by the prior art require microcontrollers for the math needed to support the algorithm. At least some embodiments of the present invention use simple integer math, and need only proportional control to accomplish the method.

Prior art solutions require complex coordinate transforms, and rely on knowing parametric data about the motor, such as inductance, coil resistance, torque, rotor mass, etc. Embodiments described herein may require only the rudimentary initial condition information (when to commutate and when to sample the BEMF, minimum PWM Duty Cycle for coil drive), direction of rotation, and the maximum speed. Rather than relying on predictions and estimators, the embodiments described herein provide a very straightforward method of knowing what the rotational period needs to be, and adjusting to minimize the zero crossing error.

Part of this simplicity comes from knowing where the absolute maximum efficiency occurs. This occurs when all the energy supplied is being used, meaning there is no "extra" torque available for the motor. This condition leads to a stall if the environmental conditions change, reflecting the need for additional torque from the motor, and none is available. This environmental change can be imperceptible to the observer, and produces erratic behavior. In one embodiment, by controlling the motor to run slightly less then maximum efficiency, this allows the control loop the time needed to make the adjustments in period to accommodate the additional torque required. This is accomplished by truncating the error signal in the calculations, leaving a small residual zero crossing error. This stabilizes the loop, and allows for rapid changes in rotational period, since there is no temporal lag from integration or prediction calculations.

Since the algorithm is straightforward, and requires no higher order mathematical calculations, the implementation can be achieved in a state-machine based digital controller and mixed-signal ASIC, versus the mixed-signal microcontroller approach. The reduction in power requirements means the overall footprint of the device can be much smaller for the same motor. Other embodiments of the invention utilize a mixed-signal microcontroller approach.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a motor, wherein the motor comprises a plurality of electromagnets, the method comprising:

calculating a pulse-width modulation (PWM) duty cycle;

sampling a voltage induced by rotation of the rotor at a first expected zero crossing value, wherein said sampling produces a first sampled voltage value;

calculating an average of a plurality of sampled voltage values, wherein the plurality of sampled voltage values comprise voltage values sampled at a plurality of prior expected zero crossing values and the first sampled voltage value;

subtracting the first sampled voltage value from the calculated average to produce a delta zero crossing error;

multiplying the delta zero crossing error by a first constant, wherein the first constant represents electromechanical properties of the motor, to produce a representation of an angular velocity;

generating one or more time values based on the representation of the angular velocity;

controlling operation of the motor based on the one or more time values and the PWM duty cycle.

2. The method of claim 1, wherein the representation of the angular velocity is truncated to an integer value.

3. The method of claim 1, wherein said generating one or more time values based on the representation of the angular velocity comprises dividing the representation of the angular velocity by a second constant to produce the one or more time values, wherein the second constant represents properties of the motor.

4. The method of claim 1, wherein the one or more time values represent a period.

5. The method of claim 1, wherein the one or more time values represent an amount of time until a next commutation of the plurality of electromagnets.

6. The method of claim 1, further comprising:
repeating the method over a plurality of iterations, wherein the one or more time values comprise a next zero crossing value, wherein each iteration of the method is based on using the next expected zero crossing value of the previous iteration as the first expected zero crossing value.

7. The method of claim 1, wherein the PWM duty cycle is calculated based on a minimum duty cycle and an input command.

8. The method of claim 7, wherein the input command is updatable at an adjustable interval.

9. The method of claim 8, further comprising:
repeating the method over a plurality of iterations;
wherein the adjustable interval comprises a number of iterations of the method, wherein the adjustable interval is adjustable based on a number of intervals that have occurred since initiation of the method.

10. An electronic motor, comprising
a rotor comprising a permanent magnet;
a stator comprising a plurality of electromagnets;
a voltage sensor configured to measure a voltage induced across an electromagnet of the plurality of electromagnets;
logic configured to:
calculate a pulse-width modulation (PWM) duty cycle;
use the voltage sensor to sample a voltage across the electromagnet of the plurality of electromagnets at an expected zero crossing value to produce a first sampled voltage value, wherein the voltage across the electromagnet is induced by rotation of the rotor;

calculate an average of prior voltage values sampled at a plurality of expected zero crossing values and the first sampled voltage value;

subtract the first sampled voltage value from the calculated average to produce a delta zero crossing error;

multiply the delta zero crossing error by a first constant, wherein the first constant represents electromechanical properties of the motor, to produce a representation of an angular velocity;

generate one or more time values based on the representation of the angular velocity;

control operation of the motor based on the one or more time values and the PWM duty cycle.

11. The electronic motor of claim 10, wherein the representation of the angular velocity is truncated to an integer value.

12. The electronic motor of claim 10, wherein said generating one or more time values based on the representation of the angular velocity comprises dividing the representation of the angular velocity by a second constant to produce the one or more time values, wherein the second constant represents properties of the motor.

13. The electronic motor of claim 10, wherein the one or more time values represent a period.

14. The electronic motor of claim 10, wherein the one or more time values represent an amount of time until a next commutation of the plurality of electromagnets.

15. The electronic motor of claim 10,
wherein the logic is further configured to operate over a plurality of iterations, wherein the one or more time values comprise a next zero crossing value, wherein each iteration of the method is based on using the next expected zero crossing value of the previous iteration as the first expected zero crossing value.

16. The electronic motor of claim 10, wherein the PWM duty cycle is calculated based on a minimum duty cycle and an input command.

17. The electronic motor of claim 16, wherein the input command is updatable at an adjustable interval.

18. The electronic motor of claim 17,
wherein the logic is further configured to operate over a plurality of iterations;
wherein the adjustable interval comprises a number of the iterations, wherein the adjustable interval is adjustable based on a number of intervals that have occurred since initiation of the method.

19. The electronic motor of claim 10, wherein the logic comprises a state-machine based digital controller and a mixed signal application specific integrated circuit.

20. The electronic motor of claim 10, wherein the logic comprises a computer-accessible memory medium storing program instructions executable by a processor to perform the listed steps.

* * * * *